US010025170B2

(12) United States Patent
Tervo et al.

(10) Patent No.: US 10,025,170 B2
(45) Date of Patent: Jul. 17, 2018

(54) AVOIDING INTERFERENCE BY REDUCING SPATIAL COHERENCE IN A NEAR-EYE DISPLAY

(71) Applicant: Microsoft Technology Licensing, LLC, Redmond, WA (US)

(72) Inventors: Jani Kari Tapio Tervo, Espoo (FI); Tuomas Heikki Sakari Vallius, Espoo (FI); Seppo Kalevi Honkanen, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 15/181,337

(22) Filed: Jun. 13, 2016

(65) Prior Publication Data

US 2017/0357101 A1    Dec. 14, 2017

(51) Int. Cl.
| | | |
|---|---|---|
| *G03B 21/20* | (2006.01) | |
| *G02B 1/11* | (2015.01) | |
| *G02B 27/01* | (2006.01) | |
| *G02B 27/28* | (2006.01) | |
| *G02B 27/42* | (2006.01) | |

(Continued)

(52) U.S. Cl.
CPC ............ *G03B 21/2033* (2013.01); *G02B 1/11* (2013.01); *G02B 27/0081* (2013.01); *G02B 27/0172* (2013.01); *G02B 27/286* (2013.01); *G02B 27/4205* (2013.01); *G02B 27/48* (2013.01); *G06T 19/006* (2013.01); *G02B 2027/0125* (2013.01); *G02B 2027/0178* (2013.01)

(58) Field of Classification Search
CPC ...... G02B 27/48; G02B 1/11; G02B 27/0172; G02B 27/286; G02B 27/4205; G06T 19/006; G03B 21/2033; G03B 21/206
See application file for complete search history.

(56) References Cited

U.S. PATENT DOCUMENTS

| | | |
|---|---|---|
| 5,923,425 A | 7/1999 | Dewa et al. |
| 6,323,984 B1 | 11/2001 | Trisnadi |

(Continued)

FOREIGN PATENT DOCUMENTS

| | | |
|---|---|---|
| CN | 104166316 A | 11/2014 |
| TW | 200938959 A | 9/2009 |

OTHER PUBLICATIONS

Fu, et al., "Partially coherent polarized atmospheric transmission characteristics and application technology research", In Proceedings of the SPIE, International Symposium on Optoelectronic Technology and Application, vol. 9300, Nov. 2014, 3 pages.

(Continued)

*Primary Examiner* — Sultan Chowdhury
*Assistant Examiner* — Magda Cruz
(74) *Attorney, Agent, or Firm* — Arent Fox LLP

(57) ABSTRACT

Disclosed are an apparatus and method for reducing interference for a near-eye display device. The near-eye display device includes an imager, a spatial light modulator and a waveguide. The imager generates an image based on light from a coherent light source. The spatial light modulator modulates phases of a plurality of coherent light rays representing the image received from the imager. The waveguide receives and guides the light rays having varied phases such that light rays propagating within the waveguide are incoherent with each other.

20 Claims, 8 Drawing Sheets

(51) Int. Cl.
*G02B 27/48* (2006.01)
*G06T 19/00* (2011.01)
*G02B 27/00* (2006.01)

(56) References Cited

U.S. PATENT DOCUMENTS

| | | |
|---|---|---|
| 6,742,707 B1 | 6/2004 | Tsikos et al. |
| 8,390,926 B2 | 3/2013 | Bordenyuk |
| 2008/0024594 A1 | 1/2008 | Ritchey |
| 2008/0204847 A1 | 8/2008 | Kamm et al. |
| 2009/0128902 A1 | 5/2009 | Niv et al. |
| 2009/0257028 A1 | 10/2009 | Osawa et al. |
| 2009/0285529 A1 | 11/2009 | Iazikov et al. |
| 2010/0231693 A1 | 9/2010 | Levola |
| 2012/0162657 A1 | 6/2012 | Rafac et al. |
| 2013/0222384 A1 | 8/2013 | Futterer |
| 2014/0140654 A1* | 5/2014 | Brown ............... G02F 1/29 385/10 |
| 2015/0172610 A1 | 6/2015 | Candry et al. |
| 2015/0253487 A1 | 9/2015 | Nichol et al. |
| 2016/0124229 A1 | 5/2016 | Yokoyama |

OTHER PUBLICATIONS

Tikhonov, et al., "Measurement of radiation coherence by means of interference visibility in the reflected light", In Journal of Optics, Retrieved on: Nov. 18, 2015, pp. 1-13.

Goldwasser, Samuel M., "Items of Interest", Published on: Sep. 19, 2000 Available at: http://www.repairfaq.org/sam/laserioi.htm.

Hyde, et al., "Experimentally generating any desired partially coherent Schell-model source using phase-only control", In Journal of Applied Physics, vol. 118, Issue 9, Sep. 1, 2015, 11 pages.

"International Search Report and Written Opinion Issued in PCT Application No. PCT/US2017/036244", dated Dec. 4, 2017, 19 Pages.

* cited by examiner

AVOIDING INTERFERENCE BY REDUCING SPATIAL COHERENCE IN A NEAR-EYE DISPLAY

BACKGROUND

Near-eye display (NED) devices such as head-mounted display (HMD) devices have been introduced into the consumer marketplace recently to support visualization technologies such as augmented reality (AR) and virtual reality (VR). An NED device may include components such as one or more light sources, microdisplay modules, controlling electronics, and various optics such as waveguides, lenses, beam splitters, etc.

Waveguides may be used in an NED device to convey light representing artificially-generated images from the image generation components of the device to an optical receptor of a user (e.g., a human eye). One or more of these waveguides may act as the device's image output interface to the user; these waveguides can be referred to as "output waveguides" of the device. For example, with a near-eye AR device, the user may see computer-generated images projected from a transparent output waveguide while the user views the real world through the output waveguide. In this way, the computer-generated images appear to be superimposed over the user's real-world environment.

Light-emitting diode (LED) modules may be used in an NED device to generate light for image generation. However, an NED device with a large field of view and a high resolution may require using relatively large LED modules that have a significantly large size. The large LED modules lead to a bulky product, which is undesirable since the product is typically worn by a user.

SUMMARY

Introduced here are at least one apparatus and at least one method (collectively and individually, "the technique introduced here") for reducing interference caused by spatial coherence within a waveguide. NED devices can include coherent light sources (e.g., laser scanners) to achieve a larger field of view and/or better resolution than conventional LED sources. Due to the nature of the coherent light source, the coherent light rays, which are diffracted in a waveguide of an NED device, can overlap and interfere with each other. To reduce the interference, an NED device according to the technique introduced here can include a spatial light modulator (SLM) to modulate phases of the light rays so that light rays after modulation are no longer coherent with each other and therefore do not interfere within the waveguide.

In some embodiments, the NED device includes an imager, an SLM and a waveguide. The imager generates an image based on light from a coherent light source. The SLM modulates phases of a plurality of coherent light rays representing the image received from the imager. The waveguide receives and guides the light rays having varied phases such that light rays propagating within the waveguide are incoherent with each other.

In some embodiments, a method for reducing interference includes steps of: generating a plurality of coherent light rays, by a coherent light source of the an NED device, representing an image to be conveyed to an optical receptor of a user of the NED device; modulating phases of the coherent light rays, by an SLM of the NED device; diffracting each of modulated light rays into a plurality of diffraction orders, by a diffractive optical element (DOE); and propagating light rays of the diffraction orders within a waveguide of the NED device such that the light rays of the diffraction orders within the waveguide are incoherent with each other.

In some embodiments, the NED device includes an imager and a waveguide. The imager generates an image based on light from a coherent light source. The waveguide receives a plurality of light rays representing the image received from the imager and diffracts each of the light rays into a plurality diffraction orders. The waveguide includes an optical structure to change an optical property of an individual diffraction order of a first light ray among the light rays such that the individual diffraction order of the first light ray does not interfere with another diffraction order of a second light ray among the light rays.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
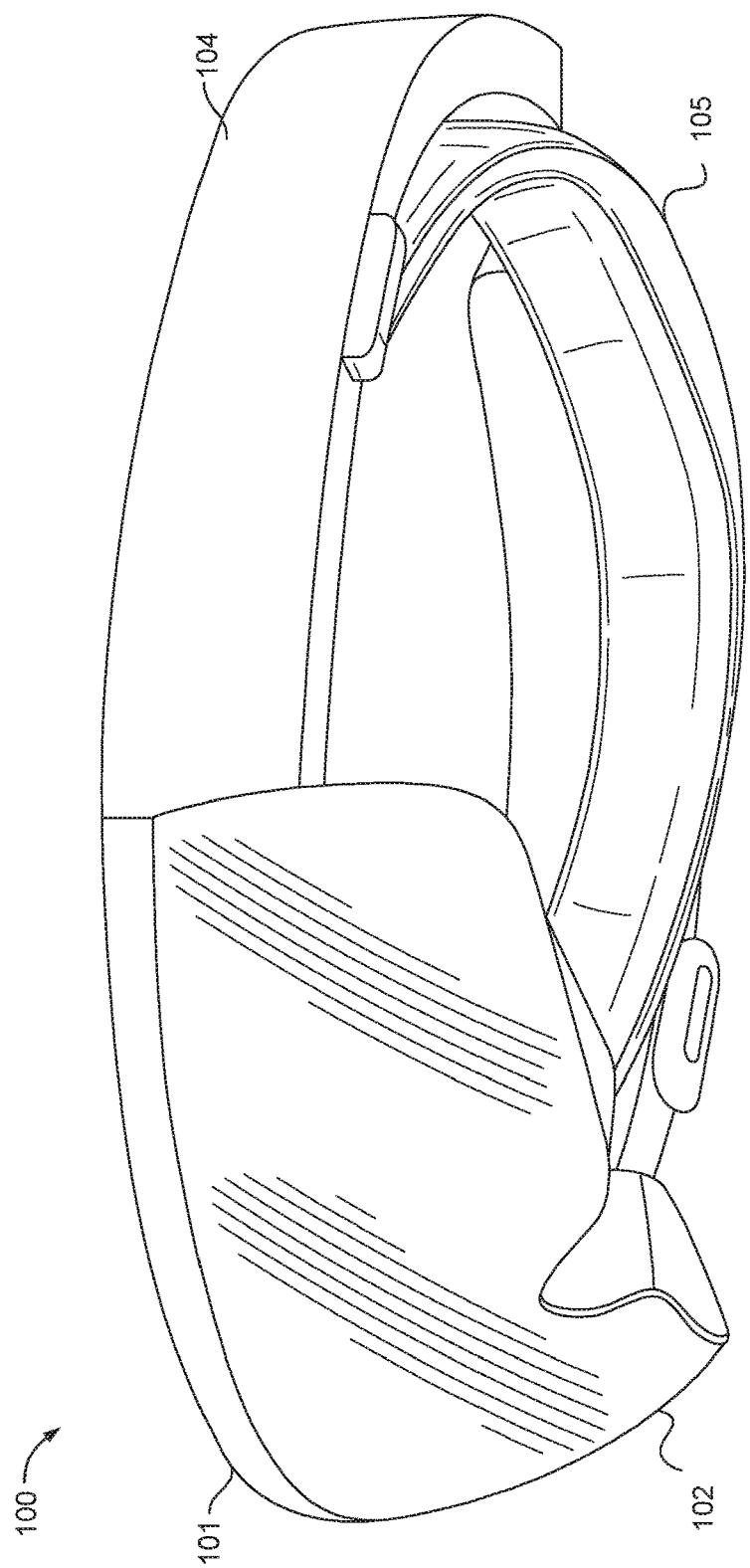
FIG. 1 shows an example of an NED device that may incorporate the technique introduced herein.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Some near-eye display devices includes light-emitting diodes (LEDs) as light sources and one or more output waveguides positioned in front of one or more optical receptors of a user of the NED device. The user may be a person, an animal or a machine, such that an "optical receptor" in this context can be a human's or animal's eye or an optical sensor of a machine. The LEDs emit light rays that represent an image to be perceived by the optical receptors of the user. Each light ray is an electromagnetic wave in the human visible spectrum, the infrared spectrum, or the ultraviolet spectrum. The output waveguides can propagate and expand the light rays provided by the light sources and guide the light rays toward an optical receptor of the user using diffractive optical elements (DOEs). For example, the output waveguide can expand a light ray in a particular direction. Expanding in this context means that the light ray is split into multiple light rays (also referred to as "expanded light rays," or collectively referred to as "pupil") via reflections and diffractions by the DOEs. The propagation directions of the expanded light rays are parallel to each other. The expanded light rays are spaced or distributed along the particular direction.

Unlike light rays emitted by laser, the light rays emitted by the LEDs are not coherent. One metric for measuring longitudinal spatial coherency is the coherence length, which is the propagation distance over which a coherent wave (e.g., a light ray) maintains a specified degree of coherence. The coherence length of light of the LEDs is generally much shorter than the thickness of the output waveguide. As a result, there is no interference between the light rays due to expansion of the light rays (also referred to as "pupil expansion") in the output waveguide.

However, LEDs may not be ideal light sources for at least some NED devices. It is desirable for an NED device to have a field of view (FOV) close to a FOV of a human, which is about 180 degrees. Such a wide FOV results in a great sense of immersion and situational awareness for the AR or VR effect created by the NED device. The larger FOV of the NED device requires LEDs and driving circuits with significant sizes and weights, which severely limit the design of the NED device. Particularly, a display device with a wide FOV requires the LEDs use liquid crystal on silicon (LCOS) components that are expensive to manufacture and consume a large amount of power during operation.

To replace LEDs, the NED device can use a laser as a more efficient and compact light source. For example, the NED device can include a laser scanner for generating light rays representing an image, for a better field of view and a better resolution. Due to the nature of the laser as a coherent light source, the light rays generated by the laser scanner are highly coherent. In other words, those light rays have a constant phase difference and the same frequency. The coherent light rays enter the output waveguide and interfere with each other inside of the waveguide. Those interferences are undesirable, because they cause noticeable fluctuation of light intensity and reduce the image quality perceived by the optical receptors of the users.

To minimize interference between the coherent light rays, the NED device disclosed herein can include an SLM to vary the phases of the laser light rays before the light rays reach the output waveguide so that the light rays entering the output waveguide are no longer coherent and do not interfere with each other. Furthermore, the output waveguide can include one or more optical structures at the bottom of the output waveguide to change intensity, polarization, or propagation direction of some of the light rays so that the light rays do not interfere with each other.

FIG. 1 shows an example of an NED device in which the technique introduced here can be incorporated. Note, however, that a product that incorporates the technique introduced here can have any of various form factors and is not limited to that shown in FIG. 1. The NED device 100 may provide virtual reality (VR) and/or augmented reality (AR) display modes for the user, i.e., the wearer of the device. To facilitate description, it is henceforth assumed herein that the NED device 100 is designed for AR visualization.

In the illustrated embodiment, the NED device 100 includes a chassis 101, a transparent protective visor 102 mounted to the chassis 101, and left and right side arms 104 mounted to the chassis 101. The visor 102 forms a protective enclosure for various display elements (not shown) that are discussed below.

The chassis 101 is the mounting structure for the visor 102 and side arms 104, as well as for various sensors and other components (not shown) that are not germane to this description. A display assembly (not shown) that can generate images for AR visualization is also mounted to the chassis 101 and enclosed within the protective visor 102. The visor assembly 102 and/or chassis 101 may also house electronics (not shown) to control the functionality of the display assembly and other functions of the NED device 100. The NED device 100 further includes an adjustable headband 105 attached to the chassis 101, by which the NED device 100 can be worn on a user's head.

Figure 2:
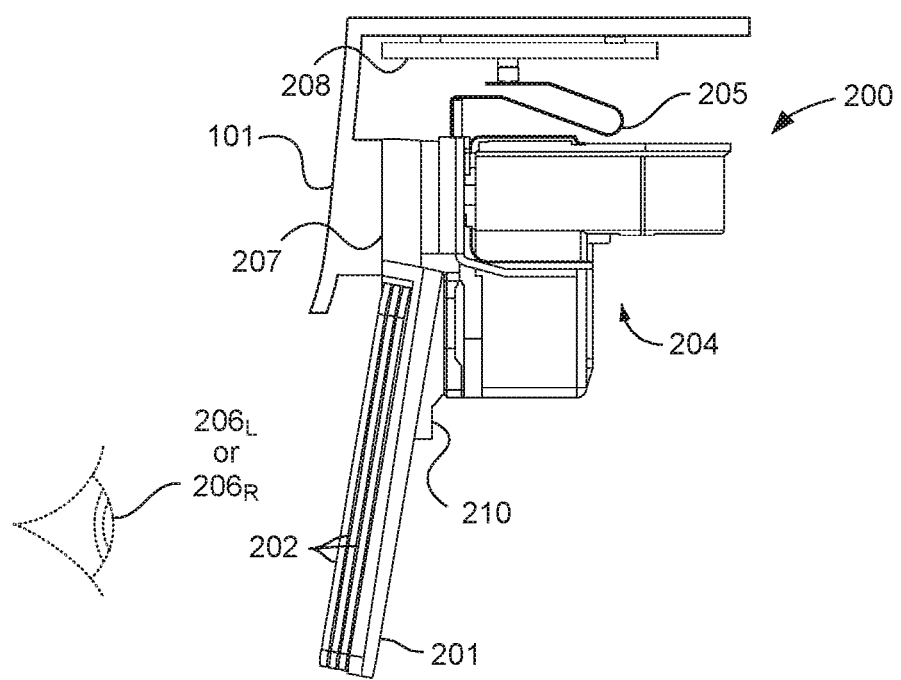
FIG. 2 shows a side view of display components that may be contained within the NED device of FIG. 1.

FIG. 2 shows, in accordance with certain embodiments, a side view of display components that may be contained within the visor 102 of the NED device 100. During operation of the NED device 100, the display components are positioned relative to the user's left eye $206_L$ or right eye $206_R$. The display components are mounted to the interior surface of the chassis 101. The chassis 101 is shown in cross-section in FIG. 2.

The display components are designed to overlay three-dimensional images on the users view of his real-world environment, e.g., by projecting light into the user's eyes. Accordingly, the display components include a display module 204 that houses a light engine including components such as: one or more light sources (e.g., one or more light emitting diodes (LEDs), or one or more laser scanners); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 204 may be connected via a flexible circuit connector 205 to a printed circuit board 208 that has image generation/control electronics (not shown) mounted on it.

The display components further include a transparent waveguide carrier 201 to which the display module 204 is mounted, and multiple transparent output waveguides 202 stacked on the user's side of the waveguide carrier 201, for each of the left eye and right eye of the user. The waveguide carrier 201 has a central nose bridge portion 210, from which its left and right waveguide mounting surfaces extend. Multiple waveguides 202 are stacked on each of the left and right waveguide mounting surfaces of the waveguide carrier 201, to project light emitted from the display module and representing images into the left eye $206_L$ and right eye $206_R$, respectively, of the user. The display assembly 200 can be mounted to the chassis 101 through a center tab 207 located at the top of the waveguide carrier 201 over the central nose bridge section 210.

The NED device can provide light representing an image to an optical receptor of a user. The user may be, e.g., a human, an animal or a machine.

Figure 3:
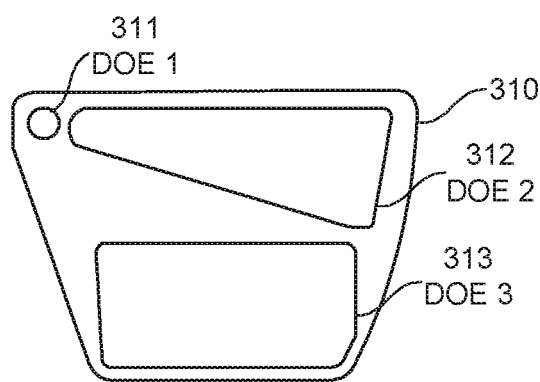
FIG. 3 shows an example of a waveguide to convey light to an eye of the user.

FIG. 3 shows an example of an output waveguide that can be mounted on the waveguide carrier 201 to convey light to an eye of the user. A similar waveguide can be designed for the left eye, for example, as a (horizontal) mirror image of the waveguide shown in FIG. 3. The waveguide 310 is transparent and, as can be seen from FIG. 2, would normally be disposed directly in front of the right eye of the user during operation of the NED device, e.g., as one of the waveguides 202 in FIG. 2. The waveguide 310 is, therefore, shown from the user's perspective during operation of the NED device 100. In some alternative embodiments, separate waveguides such as waveguide 310 can be disposed in front of each of the left eye and right eye of the user during operation of the NED device.

The waveguide 310 includes a single input port 311 (also called in-coupling element) located in the region of the waveguide 310 that is closest to the user's nose bridge when the NED device 100 is worn by the user. The input port 311 may be formed from, for example, a surface diffraction grating, volume diffraction grating, or a reflective component. The waveguide 310 further includes a single output port 313 (also called out-coupling element) and a transmission channel 312. A right-eye output port of the display module 204 (not shown) is optically coupled (but not necessarily physically coupled) to the input port 311 of the waveguide 310. During operation, the display module 204 (not shown) outputs light representing an image for the right eye from its right-eye output port into the input port 311 of the waveguide 310.

The transmission channel 312 conveys light from the input port 311 to the output port 313 and may be, for example, a surface diffraction grating, volume diffraction grating, a polarization grating, or a reflective component. The transmission channel 312 may be designed to accomplish this by use of total internal reflection (TIR). Light representing the image for the right eye is then projected from the output port 313 to the user's eye.

The waveguide 310 may include multiple diffraction optical elements (DOEs), to control the directions of the light propagating in the NED device via multiple occurrences of optical diffraction. The DOEs may be, for example, surface diffraction gratings, polarization gratings, or volume diffraction gratings. Various components of the waveguide 310 can be designed to contain one or more of the DOEs.

For example, the waveguide 310 may include three DOEs. The input port 311 of the waveguide 310 is a DOE 1 for coupling light into the waveguide 310 and controlling the direction of light path after the light reaches the input port 311. The transmission channel 312 of the waveguide 310 is a DOE 1 for controlling the direction of light path in the transmission channel 312 and ensuring the light propagating inside of the transmission channel 312 through total internal reflection (TIR). The output port 313 is a DOE 3 for controlling the direction of the light path after the light exits the output port 313. The waveguide including three DOEs can expand the light rays in one or more dimensions. The expansion process is also referred to as exit pupil expansion.

Figure 4:
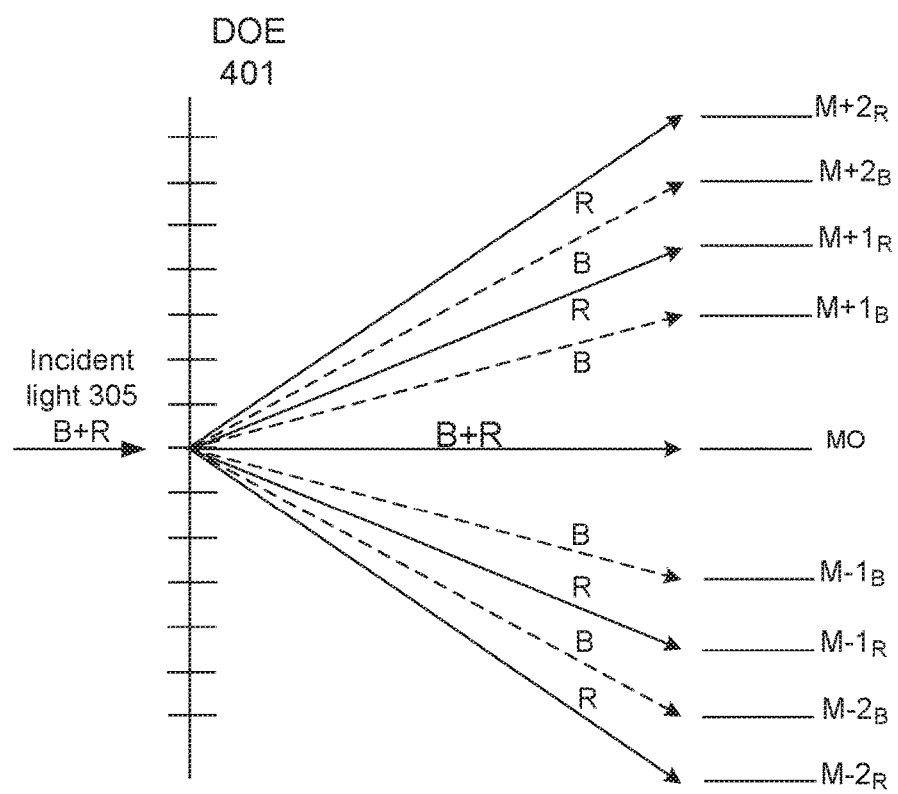
FIG. 4 shows a diffractive optical element coupling incident light into discrete diffraction orders with light paths of different directions.

Due to the periodic nature of diffractive optical elements, the incident light is coupled into discrete diffraction orders, whenever the light travels through a DOE such as a diffraction grating. FIG. 4 shows that a diffractive optical element couples incident light into discrete diffraction orders with light paths of different directions. In the illustrated example the incident light 405 includes light of two different colors blue (B) and red (R). In other words, the incident light 405 includes light of two different wavelengths (or two different ranges of wavelengths). As shown in FIG. 4, the output light on the right side of DOE 401 is split into multiple light rays in different directions. The directions of the light rays depend on the diffraction orders and the wavelengths.

The diffracted angles of the diffraction orders are governed by the grating equation, $\theta_m = \arcsin(m\lambda/d - \sin\theta_i)$. Integer m represents the propagation mode, i.e., the diffraction order. Integer m can be 0, +1, −1, +2, −2, ..., etc. Angle $\theta_m$ is the angle of the diffracted light of order m. Angle $\theta_i$ is the angle of the incident light, which is zero if the incident light 405 is normally incident on the surface of the DOE 401. Wavelength $\lambda$ depends on the color of the light. For instance, red light has a longer wavelength $\lambda$ than blue light. Grating period d is the distance between two adjacent grating lines of DOE 401 and is an intrinsic property of the grating pattern of DOE 401.

As shown in FIG. 4, the zero-th order diffraction light beam M0 still follows the direction of the incident light 405, and contains both the red and blue light. Light beams of other diffraction orders have different directions. The light beams of diffraction orders of positive integers are on the top side of the zero-th order light beam M0. The light beams of diffraction orders of negative integers are on the bottom side of the zero-th order light beam M0.

Light beams of higher diffraction orders are more deviated from the light beam of zero-th diffraction order. For example, the red light beam of −1 diffraction order M−1R is closer to the zero-th order beam M0, than the red light beam of −2 diffraction order M−2R.

According to the grating equation, the beam angles of the diffraction orders can be controlled by the grating period d. For example, by increasing or decreasing the grating period d between the adjacent diffraction grooves of the diffraction grating, the beam angles of the diffraction orders can be adjusted. Furthermore, the light energy distribution among the diffraction orders depends on the shape of the diffraction grooves. In other words, by adjusting the cross-sectional profile of the diffraction grooves, it is possible to concentrate most of the diffracted light energy in a particular diffraction order for a given wavelength. For example, by adjusting the groove profile, most of the light energy for the blue light may be concentrated on the blue light beam of +1 diffraction order M+1B.

Figure 5:
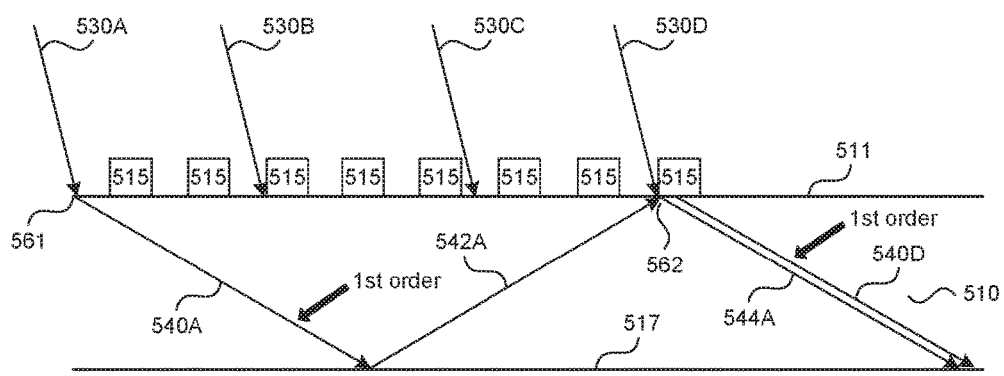
FIG. 5 shows a type of interference caused by a first diffraction order of a coherent light ray propagating within a waveguide.

As the coherent light rays emitted from the laser enter the output waveguide, multiple types of interference can occur inside of the waveguide due to the coherent nature of the light rays. FIG. 5 shows a type of interference caused by a first diffraction order of a coherent light ray propagating within a waveguide. As illustrated in FIG. 5, multiple light rays 530A, 530B, 530C, 530D emitted from a laser light source reach an input side 511 of the waveguide 510. The propagation directions of the light rays 530A, 530B, 530C, 530D are in parallel. Those parallel light rays 530A, 530B, 530C, 530D are collectively called the pupil. Due to the nature of the laser scanner, the light rays 530A, 530B, 530C, 530D are coherent, having a constant phase difference and the same frequency.

A DOE (e.g., a diffraction grating) is located on the input side 511 of the waveguide 510. The diffraction grating includes multiple diffraction grooves 515 that are parallel with each other. Each of the light rays 530A, 530B, 530C, 530D reaches the diffraction grooves 515 of the diffraction grating and is diffracted into one or more light rays of different diffraction orders. By adjusting the cross-sectional profile of the diffraction grooves 515, it is possible to concentrate most of the diffracted light energy in a particular diffraction order (also referred to as the concentrated order).

In some embodiments, the diffraction grooves are designed such that most of the diffracted light energy is concentrated in the +1 diffraction order (also referred to as the first diffraction order). For example, at location 561, light ray 530A is diffracted by the diffraction grooves 515 into one or more diffracted light rays. Among the diffracted light rays, the light ray 540A of the first diffraction order contains most of the light energy of light ray 530A. Similarly, the light ray 540D of the first diffraction order contains most of the light energy of light ray 530D.

The bottom 517 of the waveguide 510 reflects the light ray 540A of the first diffraction order into a reflected light ray 542A. In some embodiments, the light ray 540A can be reflected by a total internal reflection occurring at the bottom 517. The angle of incidence for the light ray 540A equals the angle of reflection for the reflected light ray 542A. As shown in FIG. 5, the reflected light ray 542A reaches the input side 511 at a location 562 where the light ray 530D enters the waveguide 510. The light ray 542A is further reflected and becomes the reflected light ray 544A.

As shown in FIG. 5, the light rays 544A and 540D start at the same location 562 and propagate in the same direction. In other words, the light rays 544A and 540D overlap each other. Furthermore, due to the coherent nature of the laser light source, the light rays 544A and 540D are coherent with each other and therefore interfere with each other. The problem of the interference arises due to the high spatial and temporal coherence of the light rays emitted by the laser. Because of the high temporal coherence, the thickness of the waveguide 510 is smaller than the coherence length of the light rays. Thus, the coherent light rays 544A (which already propagate between the top and bottom surfaces of the waveguide 510) and 540D interfere with each other.

On the other hand, if the light source (e.g., LEDs) emits light rays with less temporal coherence, the thickness of the waveguide 510 is larger than the coherence length of the light rays. As a result, the non-coherent light rays 544A and 540D (e.g., if they are emitted from LEDs) do not interfere with each other. Therefore, the interference problem is unique to a coherent light source such as a laser.

Figure 6:
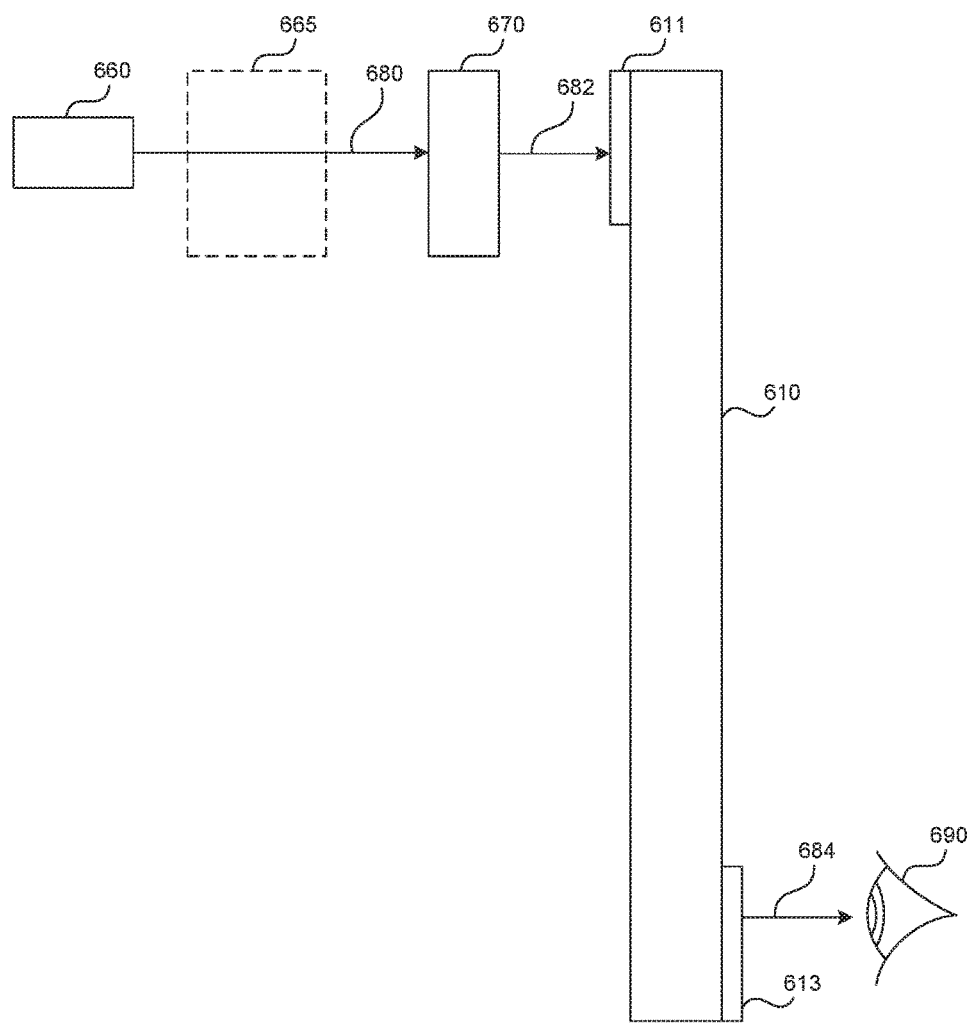
FIG. 6 shows an NED device including an SLM that reduces spatial coherence.

To avoid interference of coherent light rays within the waveguide, the NED device includes a component, e.g., an SLM, to reduce the spatial coherence of incoming light rays before the light rays reach the waveguide. FIG. 6 shows an NED device including an SLM that reduces spatial coherence. The NED device 600 includes a laser-based light source 660 (e.g., a laser scanner), an SLM 670 and a waveguide 610. In some embodiments, the NED device 600 can further include an exit-pupil expander 665.

The laser-based light source 660 generates coherent light rays 680 (collectively called a pupil). An optional exit-pupil expander 665 can further expand the coherent light rays 680. For example, the exit-pupil expander 665 can be a waveguide including diffractive optical elements (DOEs) for expanding the light rays in one or more directions. In other words, the DOEs of the exit-pupil expander 665 can translate the light rays along particular directions (or coordinate axes).

Each expanded light ray has a "propagation vector" representing the average propagation direction of the light rays and denoting a center axis of the prorogation energy of the expanded light ray. Translation of a light ray means replicating and shifting the corresponding propagation vector of the light ray along a particular direction (or coordinate axis) that is not parallel to the propagation vector itself.

The coherent light rays 680 then reach the SLM 670. The SLM 670 can include multiple ports (also referred to as pixels). Each port of the SLM 670 receives one or more of the incoming coherent light rays 680 and modulates the corresponding light ray independently. In other words, each port of the SLM imposes spatially varying modulation on one of the coherent light rays 680 to alter the phase. The modulation of each port can be independently controlled by an SLM controller (not shown). In some embodiments, the SLM controller is part of the SLM 670. In some alternative embodiments, the SLM controller is external to the SLM 670.

Particularly, each port of the SLM 670 can independently modulate the phase of the corresponding one of the coherent light rays 680, without changing the overall intensity or frequency of the light ray. The ports of the SLM can include Digital Light Processing (DLP) micro-mirror device(s) or Liquid Crystal on Silicon (LCoS) device(s), for example, as the mechanism for modulating the phases of the light rays. In some embodiments, the SLM 670 can modulate the intensity of the coherent light rays 680 if the SLM 670 includes intensity modulation devices such as digital micro-mirror devices.

Among the phases of light rays varied by the SLM 670, a cross-spectral density function can be used to indicate the phase shift between two light rays at a particular frequency. In other words, the SLM controller can be programmed to control the temporal modulation of the ports of the SLM 670 so that a particular cross-spectral density function is achieved.

To minimize the interference between coherent light rays as illustrated in FIG. 5, the SLM 670 modulate the phases of the light rays in such a way that the phase differences between the modulated light rays reduce the spatial coherence of the light rays. Particularly, three conditions are simultaneously satisfied.

First, the temporal period of temporally periodic modulation is smaller than the response time of the human eye. In other words, the modulation of the SLM 670 is fast enough that the human eye cannot detect the varying intensity (or flickering) of the image or video caused by the temporally periodic modulation of SLM 670. The human eye can perceive the time-average effect of the modulation but not the fluctuation caused by the modulation.

Second, the modulation reduces the spatial coherence of the light rays such that two light rays entering the waveguide at two positions separated by a sufficiently large distance are no longer coherent with each other. In other words, the light rays can overlap with each other, but the light rays are not correlated due to the phase difference. For example, turning back to FIG. 5. Light rays 530A and 530D enter the waveguide 510 at two transverse locations 561 and 562 respectively. The lower limit (for coherence reduction) of the distance between locations 561 and 562 (called threshold distance) is $d=2H \tan \theta_c$. H is the distance between the input side and the output side of the waveguide (i.e., thickness of the waveguide). $\theta_c$ is the critical angle of total internal reflection for the waveguide.

If a distance between two locations is smaller than $2H \tan \theta_c$, a light ray emitted from one location cannot travel through the waveguide via total internal reflection to overlap with another light ray emitted from another location, because the total internal reflection condition is not satisfied (instead the light ray is refracted out of the waveguide). If a distance between two locations is larger than $2H \tan \theta_c$, a light ray emitted from one location can travel through the waveguide via total internal reflection to overlap with another light ray emitted from another location, as illustrated in FIG. 5.

Third, although the modulation reduces the spatial coherence of the light rays, still the reduced spatial coherence needs to be high enough so that the divergence of the pixel beam is kept small. In other words, the transverse coherence after the modulation is kept high enough so that two neighboring pixels with relatively small pixel beam divergence do not overlap with each other.

After the modulation of the SLM 670, the light rays exiting the SLM 670 are no longer coherent to each other. The non-coherent light rays 682 then enter the waveguide 610 and are diffracted by the input-coupler diffractive component (e.g., the diffraction grating with grooves 515 shown in FIG. 5). Since the non-coherent light rays 682 are parallel to each other, the rays 682 are diffracted into one or more diffraction orders that are the same for each non-coherent light ray, but at different locations of the waveguide 610. Some of the first diffraction orders are reflected by the input surface (the left side of the waveguide 610) and the output surface (the right side of the waveguide 610)

Similar to the light rays 544A and 540D shown in FIG. 5, there are at least two light rays inside the waveguide 610 that start at the same location and have the same propagation directions. However, because the light rays within the waveguide 610 are non-coherent with each other, those overlapping light rays do not interfere with each other. The non-coherent light rays are then diffracted by the output coupler diffractive component 613 such that the optical receptor 690 receives the diffracted non-coherent light rays 684.

Although the embodiments illustrated in FIGS. 5 and 6 use the first diffraction order as an example of the concentrated diffraction order, the technique disclosed herein can be applied to systems using any integer number of diffraction order as the concentrated diffraction order.

Figure 7:
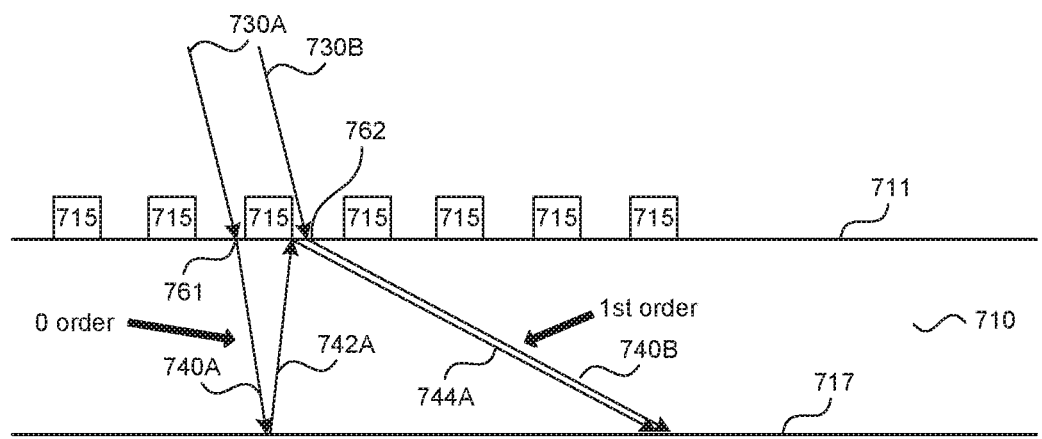
FIG. 7 shows another type of interference caused by a zero-th diffraction order of a coherent light ray propagating within a waveguide.

While FIG. 5 shows a type of interference caused by a first diffraction order of a coherent light ray propagating within a waveguide, FIG. 7 shows another type of interference between coherent light rays within a waveguide, caused by the zero-th diffraction order of a coherent light ray propagating within a waveguide.

Multiple light rays 730A, 730B emitted from a laser scanner reach an input side 711 of the waveguide 710. The propagation directions of the light rays 730A, 730B are in parallel. Due to the nature of the laser scanner, the light rays 730A, 730B are coherent, having a constant phase difference and the same frequency.

The diffraction grooves 715 of a diffraction grating diffract each of the light rays 730A, 730B into multiple diffraction orders. The diffraction grooves are designed such that most of the diffracted light energy is concentrated in +1 diffraction order (also referred to as first diffraction order). For example, light ray 740B is the first diffraction order of the light ray 730B. Other than the first diffraction order, there is also a zero-th diffraction order, which does not contain the most of the diffracted light energy. For example, light ray 740A is the zero-th diffraction order of the light ray 730A, which is diffracted at location 761.

The bottom 717 (also referred to as output side) of the waveguide 710 reflects (e.g. via total internal reflection) the light ray 740A of the zero-th diffraction order into a reflected light ray 742A. As shown in FIG. 7, the reflected light ray 742A reaches the input side 711 at a location 762 where the light ray 730B enters the waveguide 710. The light ray 742A is further reflected and becomes the reflected light ray 744A.

As shown in FIG. 7, the light rays 744A and 740B start at the same location 762 and propagate in the same direction. In other words, the light rays 744A and 740B overlap with each other. Furthermore, due to the coherent nature of the laser light source, the light rays 744A (zero-th diffraction order) and 740B (first diffraction order) are coherent with each other and therefore interfere with each other. This type of interference is called Fabry-Perot type interference.

The interference can be either constructive interference, destructive interference, or certain interference in between, depending on the waveguide thickness and the angle of incidence of the light rays 730A, 730B. Since the differences between the thicknesses of the waveguide components can be larger than the wavelength, the interference type can be different from one waveguide component to another waveguide component, depending on the design of the display devices.

As illustrated in FIG. 7, such interference occurs at a relatively small angle of incidence and mainly arises from highly temporal coherence of the incident light rays. Modulation of spatial coherence by SLM cannot minimize this type of interference because the SLM cannot achieve the required reduction of the coherence length. Instead, the waveguide can include one or more optical structures at the bottom (output side) to prevent the interference.

Figure 8:
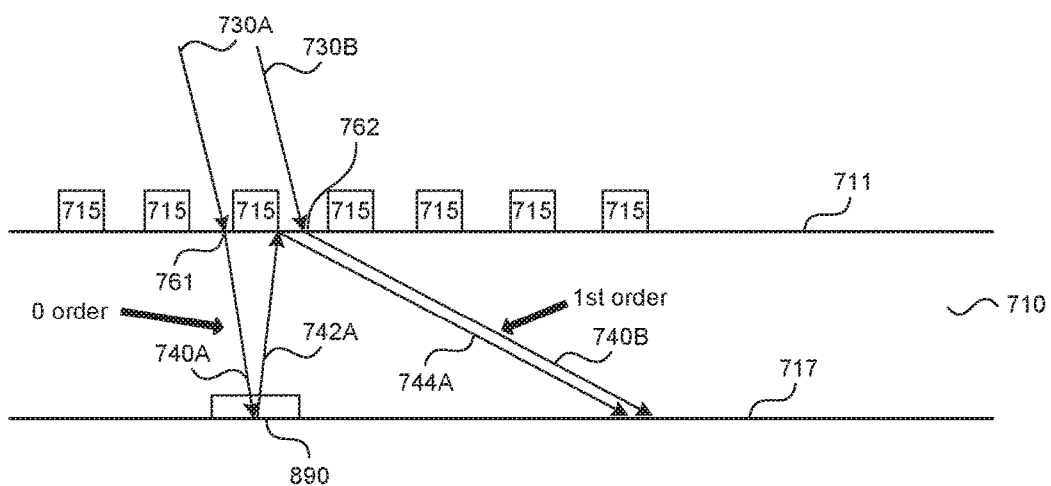
FIG. 8 shows a waveguide including optical structures for minimizing interference caused by the zero-th diffraction order.

FIG. 8 shows a waveguide including optical structures for minimizing interference caused by the zero-th diffraction order. As shown in FIG. 8, the waveguide 710 includes at least one optical structure 890 for changing certain optical property of the reflected light ray 742A, to minimize or avoid the interference between light rays 744A and 740B. For example, the optical structure 890 can change the intensity, polarization, or propagation direction of the reflected light ray 742A.

In some embodiments, the optical structure 890 is or includes an anti-reflection coating for absorbing the light energy of light ray 740A so that there is no reflected light ray 742A or so that reflected light ray 742A has a negligible amount of light energy. In order words, at the location occupied by the optical structure 890, back-reflection in the waveguide 710 is prevented. The anti-reflection coating can be configured to absorb light energy at a particular frequency, or within a range of frequencies.

In some embodiments, the optical structure 890 includes a polarization-changing element at the back surface of the waveguide 710 such that the reflected light ray 742A has a different polarization (e.g., opposite polarization) from that of light ray 740A. Since light rays 730A, 740A, 730B, 740B are emitted by the same light source and therefore have the same polarization, the light ray 744A has a different polarization than that of light ray 740B. Due to the different polarization states, light ray 744A of zero-th diffraction order does not interfere with the light ray 740B of first diffraction order. The polarization-changing element can be, e.g., a circular polarizer or a linear polarizer.

In some embodiments, the optical structure 890 is a grating groove in an array of grooves of a second diffraction grating placed on the back surface of the waveguide 710. The second diffraction grating is designed such that the efficiency of the reflected zero-th order is reduced. Similarly to the anti-reflection coating, the result of the second diffraction grating is that there is no light ray 742A or so that light ray 742A has a negligible amount of light energy.

In some embodiments, the waveguide 710 can include an asymmetric diffraction grating that greatly reduces the diffraction efficiency from the reflected light ray 742A to light ray 744A. As a result, there is not light ray 744A or light ray 744A contains a negligible amount of light energy that does not cause the interference problem.

The waveguide 710 can include multiple optical structures for changing certain optical property of zero-th diffraction orders of multiple light rays. Since the design of the NED device determines the incident angle of the light rays and the thickness of the waveguide, the locations where the zero-th diffraction orders reach the back surface of the waveguide are known. Thus, the waveguide 710 can include the optical structures disposed at those known locations. The optical structures do not occupy the entire back surface of the waveguide 710 so that optical structures do not change the optical properties of the desired first orders, which reach the back surface at locations different from the zero-th diffraction orders.

Although the embodiments illustrated in FIGS. 7 and 8 use the zero-th diffraction order as an example of the non-concentrated diffraction order, the technique disclosed herein can be applied to systems using any integer number of diffraction order as the non-concentrated diffraction order.

EXAMPLES OF CERTAIN EMBODIMENTS

Certain embodiments of the technology introduced herein are summarized in the following numbered examples:

1. A display device including: an imager to generate an image based on light from a coherent light source; a spatial light modulator (SLM) to modulate phases of a plurality of coherent light rays representing the image received from the imager; and a waveguide to receive and guide the light rays having varied phases such that light rays propagating within the waveguide are incoherent with each other, the waveguide configured to output the light rays having varied phases to an optical receptor of a user of the display device.

2. The display device of example 1, wherein the waveguide includes a diffractive optical element (DOE) to diffract the coherent light rays entering the waveguide.

3. The display device of example 2, wherein the SLM modulates the phases of the coherent light rays such that diffracted orders of the light rays that overlap within the waveguide are incoherent with each other and do not interfere with each other.

4. The display device of any of examples 1 through 3, wherein the SLM modulates the phases of the coherent light rays to reduce spatial coherence of the light rays such that two light rays entering the waveguide at two positions separated by a threshold distance are incoherent with each other.

5. The display device of example 4, wherein the threshold distance depends on a thickness of the waveguide and a critical angle of a total internal reflection property of the waveguide.

6. The display device of any of examples 1 through 5, wherein a temporal period of a temporally periodic modulation of the SLM is smaller than a response time of a human eye.

7. The display device of any of examples 1 through 6, wherein the SLM modulates the phases of the coherent light rays to reduce spatial coherence of the light rays, and wherein a transverse coherence length after the modulation is small enough so that neighboring pixels of the display device have a pixel beam divergence such that the neighboring pixels do not overlap with each other.

8. The display device of any of examples 1 through 7, wherein the coherent light source includes a laser scanner.

9. The display device of any of examples 1 through $\theta_c$ wherein the coherent light source includes a plurality of modulation ports, each of the modulation ports modulating the phase of one or more of the coherent light rays, without changing intensity or frequency of the coherent light rays.

10. The display device of any of examples 1 through $\theta_c$ wherein the coherent light source includes a plurality of modulation ports, each of the modulation ports modulating the intensity of one or more of the coherent light rays.

11. The display device of example 9 or 10, wherein each of the modulation ports include a Digital Light Processing (DLP) micro-mirror device or Liquid Crystal on Silicon (LCoS) device.

12. The display device of example 11, wherein an SLM controller programs the modulation operation of the modulation ports to achieve a cross-spectral density function that is indicative of phase shifts among the light rays after modulation.

13. The display device of any of examples 1 through 12, further including: a pupil expander to expand and replicate the coherent light rays in one or more directions before the coherent light rays reach the SLM.

14. An apparatus for reducing light interference in a near-eye display device, the apparatus including: means for generating a plurality of coherent light rays by a coherent light source in the near-eye display device, plurality of coherent light rays representing an image to be conveyed to an eye of a user of the near-eye display device; means for modulating phases of the coherent light rays, by a spatial light modulator (SLM) in the near-eye display device; means for diffracting each of modulated light rays into a plurality of diffraction orders, by a diffractive optical element (DOE); and means for propagating light rays of the diffraction orders within a waveguide in the near-eye display device such that at least some of the light rays of the diffraction orders overlap within the waveguide and are incoherent with each other.

15. The apparatus of example 14, wherein the means for modulating modulates phases of the coherent light rays, by an SLM of the near-eye display device, to reduce spatial coherence of the coherent light rays such that any of two light rays entering the waveguide at two positions separated by a threshold distance are incoherent with each other, wherein the threshold distance depends on a thickness of the waveguide and a critical angle of a total internal reflection affect for the waveguide.

16. The apparatus of example 14 or 15, wherein the means for modulating modulates phases of the coherent light rays, by an SLM of the near-eye display device, at a modulation frequency that human eyes cannot detect varying intensity or flickering caused by the modulation.

17. A near-eye display device including: an imager to generate an image based on light from a coherent light source; and a waveguide to receive a plurality of light rays representing the image received from the imager and to diffract each of the light rays into a plurality diffraction orders, the waveguide including: an optical structure to change an optical property of an individual diffraction order of a first light ray among the light rays such that the individual diffraction order of the first light ray does not interfere with another diffraction order of a second light ray among the light rays.

18. The near-eye display device of example 17, wherein the optical structure includes an anti-reflection coating at a back surface of the waveguide to absorb light energy of the individual diffraction order of the first light ray.

19. The near-eye display device of example 17 or 18, wherein the optical structure includes a polarization-changing element at a back surface of the waveguide to alter polarization of the individual diffraction order of the first light ray such that the polarization of the individual diffraction order of the first light ray is different from polarization of the other diffraction order of the second light ray.

20. The near-eye display device of any of examples 17 through 19, wherein the optical structure is a grating groove that belongs to an array of grooves of a diffraction grating placed on a back surface of the waveguide such that an efficiency of the individual diffraction order of the first light ray is reduced after a diffraction by the diffraction grating at the back surface.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A display device comprising:
    an imager to generate an image based on light from a coherent light source;
    a spatial light modulator (SLM) to modulate phases of a plurality of coherent light rays representing the image received from the imager; and
    a waveguide to receive and guide the light rays having varied phases such that light rays propagating within the waveguide are incoherent with each other, the waveguide configured to output the light rays having varied phases to an optical receptor of a user of the display device.

2. The display device of claim 1, wherein the waveguide includes a diffractive optical element (DOE) to diffract the coherent light rays entering the waveguide.

3. The display device of claim 2, wherein the SLM modulates the phases of the coherent light rays such that diffracted orders of the light rays that overlap within the waveguide are incoherent with each other and do not interfere with each other.

4. The display device of claim 1, wherein the SLM modulates the phases of the coherent light rays to reduce spatial coherence of the light rays such that two light rays entering the waveguide at two positions separated by a threshold distance are incoherent with each other.

5. The display device of claim 4, wherein the threshold distance depends on a thickness of the waveguide and a critical angle of a total internal reflection property of the waveguide.

6. The display device of claim 1, wherein a temporal period of a temporally periodic modulation of the SLM is smaller than a response time of a human eye.

7. The display device of claim 1, wherein the SLM modulates the phases of the coherent light rays to reduce spatial coherence of the light rays, and wherein a transverse coherence length after the modulation is small enough so that neighboring pixels of the display device have a pixel beam divergence such that the neighboring pixels do not overlap with each other.

8. The display device of claim 1, wherein the coherent light source comprises a laser scanner.

9. The display device of claim 1, wherein the coherent light source includes a plurality of modulation ports, each of the modulation ports modulating the phase of one or more of the coherent light rays, without changing intensity or frequency of the coherent light rays.

10. The display device of claim 1, wherein the coherent light source includes a plurality of modulation ports, each of the modulation ports modulating the intensity of one or more of the coherent light rays.

11. The display device of claim 9, wherein each of the modulation ports include a Digital Light Processing (DLP) micro-mirror device or Liquid Crystal on Silicon (LCoS) device.

12. The display device of claim 11, wherein an SLM controller programs the modulation operation of the modulation ports to achieve a cross-spectral density function that is indicative of phase shifts among the light rays after modulation.

13. The display device of claim 1, further comprising:
    a pupil expander to expand and replicate the coherent light rays in one or more directions before the coherent light rays reach the SLM.

14. A method for reducing light interference in a near-eye display device, the method comprising:
    generating a plurality of coherent light rays by a coherent light source in the near-eye display device, plurality of coherent light rays representing an image to be conveyed to an eye of a user of the near-eye display device;
    modulating phases of the coherent light rays, by a spatial light modulator (SLM) in the near-eye display device;
    diffracting each of modulated light rays into a plurality of diffraction orders, by a diffractive optical element (DOE); and
    propagating light rays of the diffraction orders within a waveguide in the near-eye display device such that at least some of the light rays of the diffraction orders overlap within the waveguide and are incoherent with each other.

15. The method of claim 14, wherein the step of modulating comprises:
    modulating phases of the coherent light rays, by an SLM of the near-eye display device, to reduce spatial coherence of the coherent light rays such that any of two light rays entering the waveguide at two positions separated by a threshold distance are incoherent with each other, wherein the threshold distance depends on a thickness of the waveguide and a critical angle of a total internal reflection affect for the waveguide.

16. The method of claim 14, wherein the step of modulating comprises:
    modulating phases of the coherent light rays, by an SLM of the near-eye display device, at a modulation frequency that human eyes cannot detect varying intensity or flickering caused by the modulation.

17. A near-eye display device comprising:
    an imager to generate an image based on light from a coherent light source; and
    a waveguide to receive a plurality of light rays representing the image received from the imager and to diffract each of the light rays into a plurality diffraction orders, the waveguide including:
        an optical structure to change an optical property of an individual diffraction order of a first light ray among the light rays such that the individual diffraction order of the first light ray does not interfere with another diffraction order of a second light ray among the light rays.

18. The near-eye display device of claim 17, wherein the optical structure includes an anti-reflection coating at a back surface of the waveguide to absorb light energy of the individual diffraction order of the first light ray.

19. The near-eye display device of claim 17, wherein the optical structure includes a polarization-changing element at a back surface of the waveguide to alter polarization of the individual diffraction order of the first light ray such that the polarization of the individual diffraction order of the first light ray is different from polarization of the other diffraction order of the second light ray.

20. The near-eye display device of claim 17, wherein the optical structure is a grating groove that belongs to an array of grooves of a diffraction grating placed on a back surface of the waveguide such that an efficiency of the individual diffraction order of the first light ray is reduced after a diffraction by the diffraction grating at the back surface.

* * * * *